Feb. 2, 1971  S. KAZEL  3,560,973
METHOD AND APPARATUS FOR PASSIVE MAPPING
Filed Feb. 29, 1968  2 Sheets-Sheet 1
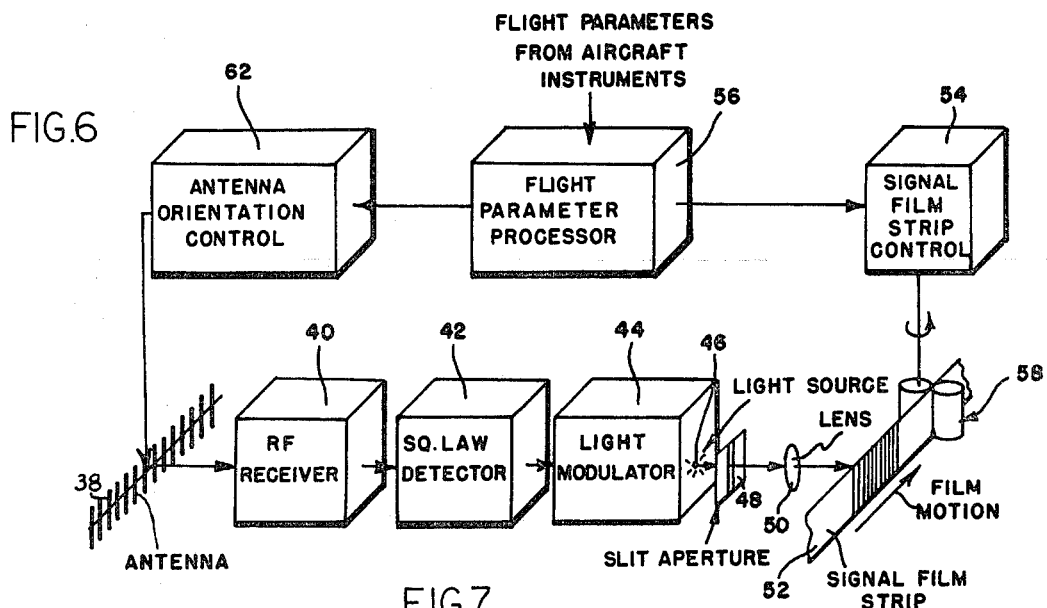
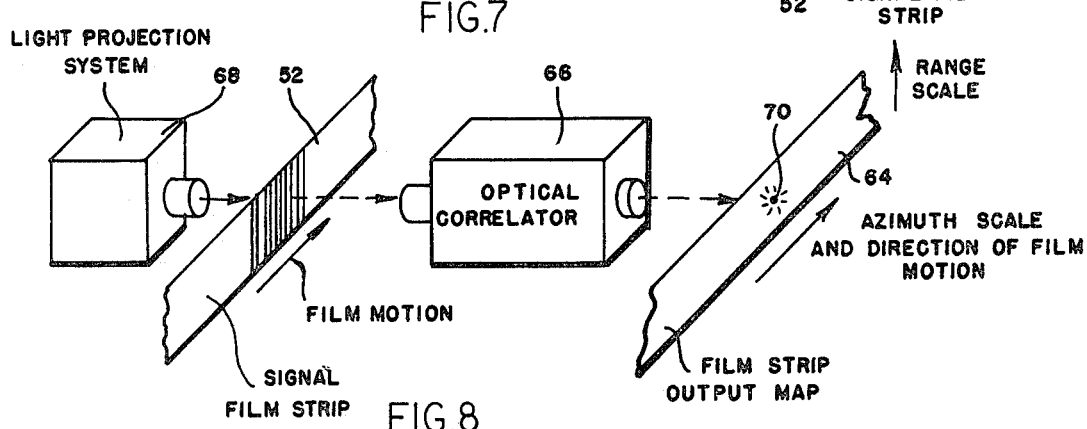
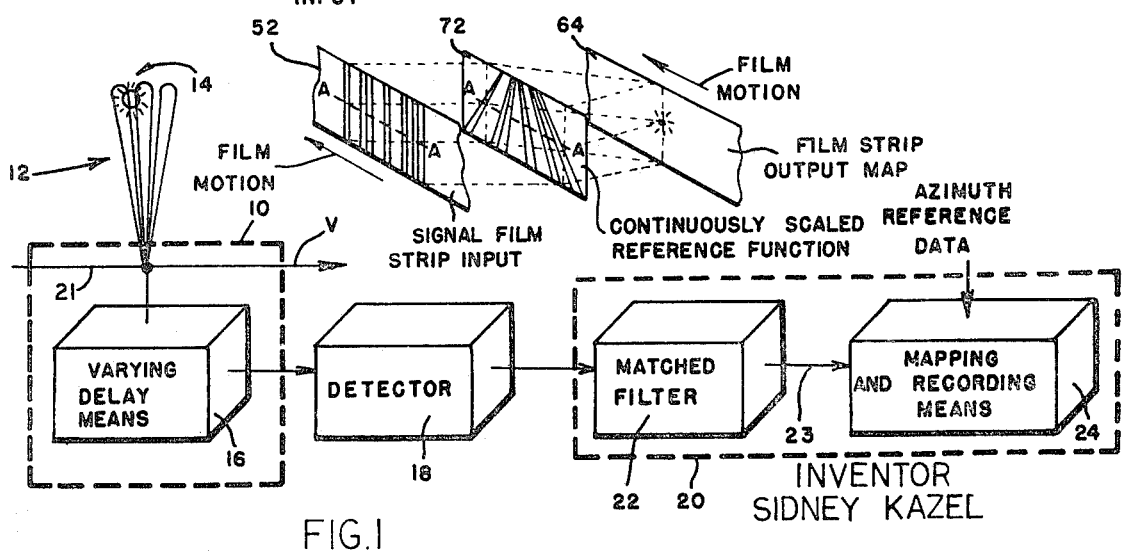
INVENTOR
SIDNEY KAZEL
BY Anderson, Luedeka, Fitch, Even, & Tabin ATTYS.

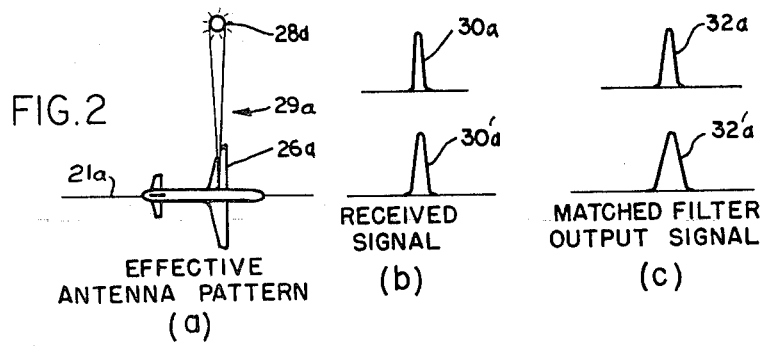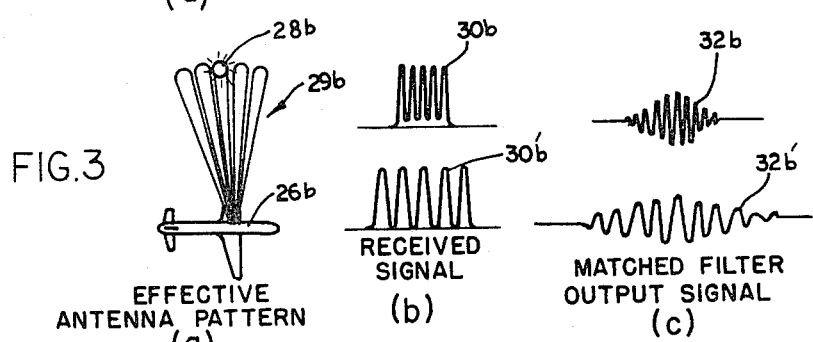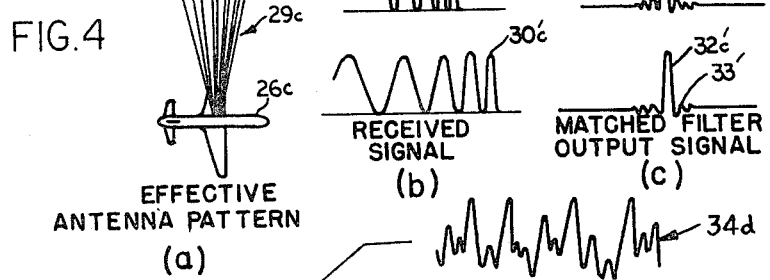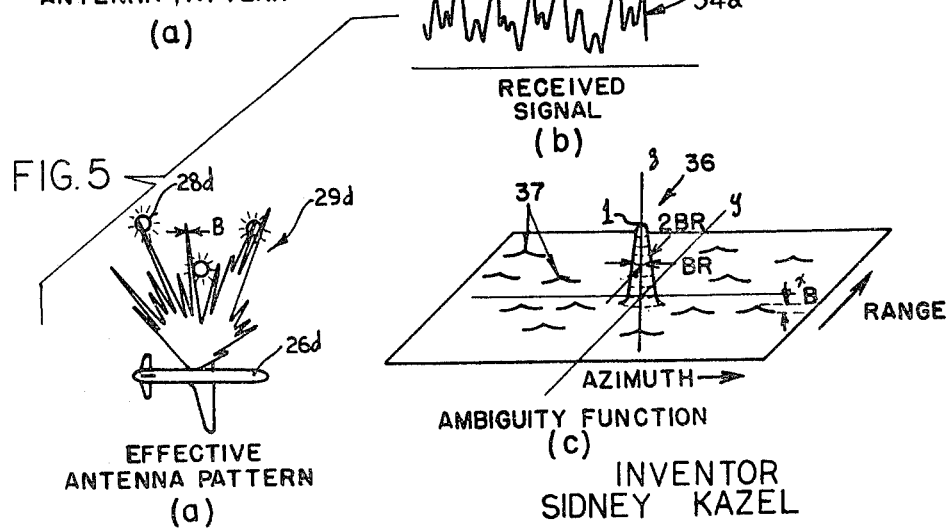

United States Patent Office 3,560,973
Patented Feb. 2, 1971

3,560,973
METHOD AND APPARATUS FOR PASSIVE MAPPING
Sidney Kazel, Chicago, Ill., assignor to IIT Research Institute, Chicago, Ill., a not-for-profit corporation of Illinois
Filed Feb. 29, 1968, Ser. No. 709,367
Int. Cl. G02s 5/02
U.S. Cl. 343—112                                    15 Claims

ABSTRACT OF THE DISCLOSURE

A method and apparatus is disclosed whereby a number of radiation emitters may be passively mapped by moving a sensor means having a multilobed receiving pattern past the emitters so that the envelope of the signal received therefrom fluctuates in accordance with the lobe structure of the pattern. The relative time of arrival of the signal is determined to provide an indication of the emitter azimuth, and the relative elongation of the received signal is determined to provide an indication of the emitter range.

---

The present invention relates to passive mapping systems, and particularly to a method and apparatus for passively mapping the point locations of sources of radiated energy. The present embodiment of the invention is directed to airborne radio reconnaissance in which electromagnetic radiation from ground transmitters is passively received by an aircraft, recorded, processed and plotted out as point locations of the sources in azimuth and range on a strip map.

The general advantages of passive radio reconnaissance as compared to radar or other active systems have heretofore been known and lie principally in the area of concealing the presence and location of the mapping vehicle or aircraft. This is especially important in military situations.

Passive detection and ranging systems are known whereby range is obtained by a time difference measurement of two received signals. A common method of passive radio mapping is one that is accomplished by the well known technique of triangulation. With this technique, a source of radiation is received first at one location and then at another location spaced in a straight line path from the first. Based on the measurements at these two locations, the position of the source is determined.

It is an object of the present invention to provide a method and apparatus for passively determining the position of a relatively large or small number of emitting sources in a continuous and relatively uncomplicated manner.

It is another object of the present invention to provide a radio reconnaissance system which plots out the point location of each emitting source in azimuth and range on an automatic real time basis.

It is a further object of the present invention to provide such a system having a maximum source resolution with respect to both range and azimuth characteristics so as to provide the source location with maximum accuracy.

These and other objects of the invention are more particularly set forth in the following detailed description and in the accompanying drawings, of which:

FIG. 1 is a generalized block diagram showing the system in accordance with an embodiment of the present invention;

FIGS. 2 through 5 are idealized schematic representations to facilitate qualitative understanding of some of the principles of the present embodiments of the invention;

FIG. 6 is a block diagram of the data sensing and recording portions of a passive mapping system in accordance with a further embodiment of the invention;

FIG. 7 is a simplified schematic illustration of the data processing portion of the system in accordance with the further embodiment of FIG. 6; and FIG. 8 is a simplified schematic illustration showing the basic operations of the optical correlator of FIG. 7.

Referring now to FIG. 1, a passive radiation-source mapping system in accordance with an embodiment of the invention is shown generally, comprising sensor means 10 having a multilobed effective receiving pattern characteristic 12 (e.g., representing gain as a function of angle) which is adapted to sense an emitting source of radiation, illustrated as point-source 14, and which is also adapted to have a velocity V (e.g., in the direction of the arrow) greater than zero relative to the source of radiation 14 to be mapped. The sensor means 10 includes a varying delay means 16 for delaying the received signal corresponding to each of the receiving lobes to provide a nonuniform phase response with respect thereto; or, more particularly, the delay means 16 provides an effective antenna pattern having generally nonuniform lobe spacing. Circuit means, illustrated as detector 18, is responsive to the output of the sensor means 10 and provides a signal which fluctuates in accordance with the phase characteristic provided by the delay means 16. This signal is fed to processing means 20 which derives therefrom an indication of the range and azimuth of the radiation source 14 relative to the sensor means 10, the range being the distance to the line-of-flight or base-line 21 and the azimuth being the distance along the base-line 21 from a given reference ground location.

The processing means 20, as illustrated, includes a matched filter 22 which receives the signal from the detector 18 and provides an output 23 based on the nature of the effective receiving characteristic or relative lobe-phase relationship of the sensor means 10. The characteristic of the matched filter output 23 is determined essentially by the particular nature of the multilobe phase characteristic signal supplied by the sensor means 10. This signal is chosen to be such as to provide a resolvable frequency spectrum or characteristic scaling of the waveform from which the range of the radiation source 14 may be determined and a resolvable prominent or sharp "peak" indicative of the azimuth position of the radiation source 14, so that the location of the radiation source may be determined by the mapping and recording means 24 which has the required azimuth reference data supplied thereto, as shown. The azimuth reference data permits the mapping and recording means 24 to define the specific ground location of the radiation source 14 by establishing the relationship of the instantaneous sensor position relative to a given ground reference location by, for example, continuously monitoring the velocity V of the sensor means 10. However, even absent such azimuth reference data, the relative positions of a plurality of sources may be determined from the relative times of arrival of their peaked signal characteristics when the velocity of the sensor is constant, or its variations are correlated with the mapping and recording means 24.

A simplified qualitative explanation, based on FIGS. 2 through 5, will now be given to facilitate an understanding of some of the principles of the invention. Referring now to FIG. 2, a reconnaissance aircraft 26a is shown flying a straight line path 21a at constant velocity, with a narrow receiving antenna beam 29a having a single lobe pattern pointed broadside to the aircraft in the direction of a ground radio transmitter 28a, assumed to be a point source of radiation. As the antenna beam is carried past the radio transmitter 28a by the motion of the aircraft, the level of the received signal 30a or 30a' traces out or follows the configuration or shape of the antenna pattern, as shown in FIG. 2b for transmitters at relatively short and long ranges, respectively. The received signal levels are seen to be relatively sharply peaked and thus the distance along the flight or base-line (azimuth) is located accurately and with good resolution. Since it takes a longer time to fly past the transmitter at a relatively long range compared to the time that it takes to fly past the transmitter at a short range, the received wave shape, or "pulse" 30a' at long range will be slightly wider or lengthened as compared to the pulse 30a at short range. In processing these received signals automatically to determine range and azimuth of the emitter, it is desired to use linear operations such as is provided by filtering or correlation. It is also desired to achieve a high signal-to-noise ratio, and thus a filter (which term may encompass correlators) is employed having a frequency response that matches the spectrum of the received waveshape. Such a filter is termed a "matched" filter or a "conjugate" filter, and its properties, per se, are generally well known. Except for a possible amplitude and delay factor, the transfer function of a matched filter is the complex conjugate of the spectrum of the signal or waveform to which it is matched.

The narrow and wide waveshapes of FIG. 2b, however, have frequency spectra which overlap a great deal, as could be determined more or less quantitatively by Fourier analysis, so that a filter matched to one of the waveshapes will not reject the other waveshape to a sufficient extent to permit discrimination between the two, and FIG. 2c generally shows the matched filter output signals 32a and 32a' produced respectively by the short and long range received signal pulses 30a and 30a'. Consequently, separation of the signals received from different ranges may not practicably be accomplished by means of band pass filters acting as ringe "bins" to catagorize the signals from different ranges to permit determination thereof. Thus, merely the lengthening characteristic of the received waveform of FIG. 2 does not provide a sufficient basis for passively determining the range of an emitting radiation source with any substantial degree of resolution, although the "peaked" signal characteristic does provide relatively good position or azimuth resolution in indicating the time of arrival of the received signal pulse.

Referring now to FIG. 3a, again a reconnaissance aircraft 26b is shown flying at constant velocity in the same straight line path previously mentioned, but now a multilobed or "interferometer" type of antenna pattern is employed pointing broadside toward the emitting source of radiation 28b. The antenna pattern shown in FIG. 3a has multiple equally spaced narrow lobes 29b. As the aircraft passes the radiation source 28b, the antenna lobes are swept thereacross to produce the received signal wavshape depicted in FIG. 3b as 30b and 30b', corresponding respectively to short and long ranges from the flight line. As can be seen, these waveshapes resemble rectangular R.F. pulses and may be characterized as having a center "frequency" or fundamental frequency component and a "duration." If the range separation is relatively large, the center frequency components will be widely separated, and if the wavshapes are of relatively long duration, their frequency spectra will be confined generally close to their respective center frequency components. Under these conditions, the frequency spectra of long and short range waveshapes will generally not overlap to a significant extent and thus may be separated by means of the narrow bandpass matched filters previously mentioned, producing output signals 32b and 32b' shown in FIG. 3c, for short and long ranges, respectively. Although the range determination can be made with relatively good accuracy or resolution by the relative elongation and consequent "frequency" separation of the waveform, the azimuth resolution has now become relatively poor since the marginal amplitude difference between the peaks of each of the signal "pulses" is relatively small. That is, since the central peak of each of the output signals is not much greater than adjacent peaks, it is relatively difficult to determine with accuracy the particular azimuth position of the radiation source within the time or duration of the R.F. pulse.

Referring now to FIG. 4, the reconnaissance aircraft 26c moves past the emitting radiation source 28c at constant velocity and in a straight line path, as described in connection with FIGS. 2 and 3. An antenna pattern 29c is provided pointing broadside from the aircraft, and has a multilobed characteristic wherein the spacing of the successive lobes of the antenna pattern 29c are not uniform, and more particularly, vary linearly. Thus, the received signals 30c and 30c' are oscillatory waveshapes having linearly varying frequencies with time (and aircraft position). The waveforms 30c and 30c' produced respectively at short and long ranges, have different center frequency components, and thus have spectral overlap which decreases as the range sepration between the two increases. Since the spectra for waveshapes from sources at various ranges will occupy different spectral positions, they may be separated by a bank of suitable bandpass filters and thereby provide the desired range resolution, as in the example illustrated in FIG. 3. In addition, however, it is a physical fact that an oscillatory waveshape with linearly varying frequency is compressed by its corresponding matched filter into a pulse of much narrower duration than the input signal. Since the bandpass filters are matched to the respective pulse shapes (in an exemplary manner to be later described), the matched filter output signals will be characterized by relatively narrow "pulses" as shown in FIG. 4c. A predominant peaking is produced by the matched filter in the output signals, indicated as 32c and 32c' for short and long ranges, and therefore good azimuth resolution is provided. Thus, the utilization of a linearly varying lobe spacing in the effective antenna receiving pattern results in both (1) good range resolution by frequency component separation produced by relative elongation of the waveforms and (2) good azimuth resolution due to the peaking of the filter output which permits on accurate indication of the radiation source position based on the time of arrival of the peaked signal.

The effective antenna receiving pattern illustrated in FIG. 4a produces, in effect, a varying delay of the signal corresponding to each of the antenna lobes so that the matched filtering means can separate the frequency spectra of the signal on the basis of range (by comparing the signals with given range references) and produce an output waveform having a characteristic sharp peak for resolving the azimuth position (relative to a given azimuth reference). The multilobed antenna pattern having suitable nonuniform lobe spacing may be provided in any suitable manner, such as for example, by appropriate spacing of the elements in the antenna array or by employing phase-shifters coupled to the antena elements. Either form of delay means is satisfactory, although such means is not limited thereto. The type of linearly varying antenna pattern illustrated in FIG. 4a may, for example, be produced by employing a broadside array having a uniform excitation amplitude across the array and phase-shifting means providing a quadratic phase distribution across the array.

A particular advantage of the passive mapping technique in accordance with the invention is its capability of independent, or linear, mapping of a plurality or multitude of radiation emitters into discrete signal "peaks" even when the signals received from the various emitters overlap in time. A fairly large number of closely spaced emitters can typically be mapped, the number being eventually limited, though, by the sidelobes appearing adjacent the prominent peak of the matched filter output signals, as shown for example in FIG. 4c as 33.

The passive mapping technique according to the present invention is subject to analysis similar to that found in radar theory wherein the propagation delay and Doppler compression of the transmitted radar pulse is used to determine the range and velocity of a target; however, in accordance with the invention, the emitter location is determined by the time of signal arrival and the scaling of the received signal. Matched filter concepts have been applied to active radar theory (see, e.g., Rihaczek, Proc. IEEE, vol. 53, pages 116–128, February, 1965) wherein it its known that in considering target ranging, the signal properties of accuracy, resolution and minimum ambiguity are significant. These properties dictate the desirability of providing a large bandwidth signal input to the matched filter to produce an output signal waveform therefrom having a narrow central peak and being as close to zero as possible everywhere else.

The actual signal received will of course be emersed in noise, and although an inverse filter may be employed to produce an output signal in the form of an impulse, which is desired, this may produce an output noise component that over-rides the output signal component impulse, since the noise spectrum increases without limit as the frequency increase to infinity, while the output signal component impulse is a constant for all frequencies. Although a matched filter produces an output pulse which is less sharp or peaked than the impulse delivered by an inverse filter, the advantage of high signal-to-noise ratio makes the employment of a matched filter generally more desirable.

Known "ambiguity function" concepts are generally employed to determine the radar resolvability of a target in the range-Doppler plane. Since the received signal in the present passive case is based on a known velocity of the sensor means, the time of arrival of the received signal characterizes the radiation source with respect to the azimuth, or distance along the base-line from a reference location. This time of arrival of the received signal corresponds to the propagation delay of the transmitted pulse in radar. As has been previously discussed, the radiation emitter may be characterized with respect to the range or distance from the base-line of sensor movement by the relative elongation or scaling of the signal envelope. The scaling of the received signal corresponds to the Doppler compression of the transmitted pulse in radar. Thus, in the passive case in accordance with the present invention, these parameters or characteristics determine the resolvability of a radiation emitter in the range-azimuth plane, and a sensor receiving pattern having an ambiguity function with a single, large sharp peak is desired to give good accuracy and resolution in both range and azimuth. Random signals of large time-bandwidth product are one class of waveforms providing this characteristic output signal from a matched filter, although other classes of waveforms may also be employed.

Referring now to FIG. 5, there is shown a reconnaissance aircraft 26d flying a straight baseline path past three emitter radiation sources 28d. An antenna having a multilobed receiving pattern 29d, generally showing gain as a function of angle (in polar coordinates), receives the emissions from the radiation sources 28d and has a random receiving lobe characteristic so that the received signals corresponding to each receiving lobe pattern is delayed in a random manner, resulting in the signal envelope 34d illustrated in FIG. 5b. The received signal envelope 34d corresponding to the random antenna pattern 29d has a random variation of amplitude with time. Feeding this signal to a matched filter, or a correlator in particular, to provide the Fourier transform of the input signal, results in an output waveform which may be described in terms of the ambiguity function 36 shown in FIG. 5c.

The ambiguity function 36 is plotted in X, Y, Z coordinates, where azimuth is plotted along the X coordinate, range is plotted along the Y coordinate and relative power is plotted along the Z coordinate. For an emitter of a particular range and azimuth the shape of the output spot or region within which the actual range and azimuth are contained is shown in the range-azimuth plane with the central peak of the ambiguity function designated as being the unit 1 for normalized or relative power. With an azimuth beamwidth of the antenna lobes of B in radians (as shown in FIG. 5a) and a range R from the baseline to the emitter being detected, the azimuth resolution provided by the shape of the output peak for the random antenna pattern is BR and the range resolution provided thereby is 2BR. The random side lobes 37 of the ambiguity function are substantially smaller than the central peak and have relative power amplitudes corresponding to the beamwidth of the antenna lobes B.

The random antenna pattern is advantageous over the linearly varying or linear FM pattern illustrated in FIG. 4 in that the central peak of the ambiguity function or output spot shape is narrower, and thus the resolution provided thereby for mapping a large number of relatively closely spaced emitters is greater. Other classes of effective antenna patterns following other functions exist which give results comparable to the random pattern described, and may be used in the passive mapping system of the present invention. As for example, other suitable classes of patterns may be of types following the functions described by J. R. Klauder, Bell System Technical Journal, volume 39, pages 809 through 820, July 1960.

The random antenna pattern illustrated and described may be provided by employing a uniformly spaced multi-element antenna array receiving constant amplitude excitation across the array and having delay means such as phase-shifters to produce random phase reversal between successive elements.

Referring now to FIG. 6, there is shown airborne data sensing and recording apparatus in accordance with a further embodiment of the present invention wherein a broadside array 38 is provided to produce a multilobe pattern in the direction away from the aircraft. The antenna 38 may be a long, linear array located along the full length of the aircraft, and for example may be 20 or 30 feet long. The antenna pattern in elevation is generally a "fan beam" and in azimuth covers about plus or minus 45°. The output signal of the airborne, multilobed antenna 38 is amplified by a conventional radio frequency receiver 40, after which it is fed to detecting means, illustrated as square law detector 42, for providing a variable signal corresponding to the envelope variation of the power output of the antenna. The signal output from the square law detector 42 is fed to light modulating means for producing a light emission of varying intensity corresponding to the variable signal input thereto, and is shown as light modulator 44 having a light source 46. The light source 46 illuminates a narrow slit aperture 48, the light from which is focused through lens 50 onto a continuously moving signal film strip 52, moving in the direciton indicated by the arrow.

The signal film strip 52 has recorded thereon the signal variations produced by the effective antenna characteristic. However, in order to specify the azimuth location of the sources of radiation detected, the signal film speed is correlated to the velocity of the aircraft by being, for example, proportional thereto, so that the physical location of a particular signal on the film strip will correspond in a known manner to the azimuth of the emitter source from a known reference point. Since the velocity of the aircraft will generally not be constant, means are provided for controlling the instantaneous speed of the signal film strip, such means being illustrated in FIG. 6 as signal film strip control 54, which receives the aircraft velocity information from a flight parameter processor 56. The flight parameter processor 56 has an input fed thereto of all necessary and appropriate flight parameters from the aircraft instruments, and by feeding the appropriate velocity information data to the signal film strip control 54, the latter determines the speed of rotation of the drive mechanism 58, and thus the speed of the film. In addition, the reconnaissance aircraft may generally turn or deviate from the line of flight by angular motion about the normal or vertical axis of the aircraft, generally termed "yaw," resulting in changes in the antenna attitude. To maintain the integrity of the range-azimuth determinations from the received signal, means are provided to compensate for the aircraft yaw, and such means are illustrated in FIG. 6 as including an antenna orientation control 62 which is responsive to the flight parameter processor 56 which receives the yaw parameters from the aircraft instruments and supplies the data in suitable form for the antenna orientation control 62. The antenna orientation control 62 then causes the antenna 38 to have a changed effective directional pattern to compensate for the yaw. This may be accomplished either by suitable mechanical rotation of the antenna or electronically by suitable known electronic steering circuitry of, for example, the phase-shifting variety.

The signal film strip control 54 and the antenna orientation control 62 may comprise any suitable and known means for performing their specified functions, and the flight parameter processor 56 which receives the flight parameters from the aircraft instruments may be of any suitable type or design for providing the required data in the proper form for utilization.

The aircraft roll and pitch will generally not have as great an affect on the system as yaw, but compensation for roll and pitch, if desired, may also be provided by the antenna orientation control 62 from suitable data supplied by processor 56 in a like manner, although such compensation may not always be necessary.

The signal film strip 52 is developed by any suitable conventional photographic developing apparatus and then processed into an output film 64 by an optical correlator 66 which generally performs the functions of a bank of matched electronic filters, but operates optically rather than electronically. The utilization of optical systems as matched filters, per se, is generally known, and is discussed, for example, by Cutrona et al., I.R.E. Trans. on Information Theory, volume IT-6, pp. 386–400, June 1960. As shown in FIG. 7, a light projection system 68 is provided to illuminate the moving signal film strip 52 of varying transparency through suitable optics (not shown), and provides the optical input signal to the optical correlator 66. The output of correlator 66 produces a small point 70 on the output film strip 64 which locates the detected emitter source in both azimuth and range to provide a strip map of all such emitter sources. The output film 64 represents a strip map of the region overflow with azimuth measured along the length of the film and range measured across the height or width of the film. The speed with which the output film 64 moves past the optical axis of the correlator 66 relative to the speed of the signal input film 52 determines the azimuth scale of the output map. Any suitable mechanism may be employed for moving the input film strip 52 and the output map 64 past the optical axis of the correlator 66, such mechanisms not being shown.

Since the method and system of the present invention provides complete transformation linearity, signals from various emitting sources may overlap on the input signal film 52 and distinct points corresponding thereto on the output film 64 will still be produced. Although variations in the strength of various sources may affect the intensity (or degree of translucency) of the discrete spots produced, the positions of the spots on the output film map are not affected by such variations.

More particularly, the optical correlator 66 correlates the received signal from the signal film strip 52 against a large number of reference functions, all replicas of the received signal but each having a progressively different predetermined scale factor corresponding to different known emitter ranges. The output of these numerous correlations of the scaled reference functions with the signal film strip input is plotted on orthogonal range-azimuth coordinates, resulting in a plot of both the sharply peaker ambiguity function and the corresponding point location of the emitter source in the range-azimuth plane on the output film strip map 64. Each emitter location appears as the sharp point of the ambiguity function peak on the film strip map by the correlation of the input signal.

As shown in FIG. 8, the input signal film record 52 moves past and is imaged onto the continuously scaled reference functions 72. The light passing through the reference 72 is indicative of the product of signal and reference film transparencies. The correlation output, which is the average product of signal and reference, is obtained by compressing the product image to a vertical line (i.e., averaging), as shown. A given emitter signal will match the continuously scaled reference function at only one level, such as A—A, and a large product will thus occur only at this height, and thereby accurately locate the emitter in range which is measured across the height of the film record 64. Furthermore, exact matching or peak correlation will occur only when the moving input signal record 52 is exactly aligned with the proper reference function, and thus at this instant of exact alignment only, which is a measure of emitter azimuth, a point of light is momentarily imaged onto the output film. The longitudinal position of this point of light or spot, considered together with the azimuth scale provided by the known speed of the output mapping strip 64, determines the azimuth location of the emitter, while the distance of the spot along the height of the film determines its range. Since the base-line path of the aircraft is known, the actual geographic locations of the detected emitter sources are readily determined.

Although a particular system employing optical correlation has been illustrated and described, other types of correlation devices may of course be employed in practicing the method of the present invention, and various types of matched filter arrangements are well known to those skilled in the art. Also, although the present embodiment has been described in terms of effective antenna pattern characteristics, it is understood that separate and distinct receivers may be employed to achieve a similar result with suitable phase shifting or delay means associated therewith. Furthermore, although the present embodiment has been described in terms of radio frequency sources, e.g., at microwave frequencies, the principles of the present invention are also applicable to the mapping of emitting sources having other forms of energy.

Various modifications of the method and apparatus of the present invention will be apparent to those skilled in the art, and accordingly, the scope of the invention should be defined only by the appended claims and equivalents thereof.

Various features of the invention are set forth in the following claims.

What is claimed is:

1. A passive radiation mapping system adapted to have a velocity greater than zero relative to a source of radiation to be mapped comprising sensor means having a multilobed receiving pattern characteristic, said sensor means including delay means for delaying the received signal corresponding to each of said lobes to provide a nonuniform phase response with respect thereto, circuit means responsive to said sensor means for providing a signal which fluctuates in accordance with the nonuniform phase characteristic of said delay means, and processing means responsive to said signal for deriving therefrom an indication of the range and azimuth of said source of radiation to said sensor means.

2. A system in accordance with claim 1 wherein said processing means includes matched filtering means and said sensor means has a phase delay characteristic of such nature that the output of said matched filtering means has a prominent peak indicative of the azimuth of said radiation source and a frequency spectrum from said sensor means indicative of the range of said radiation source.

3. A system in accordance with claim 2 wherein said matched filtering means comprises an optical correlator.

4. A system in accordance with claim 2 wherein said circuit means includes detecting means for providing a variable signal corresponding to the power variation output of said sensor means, light modulating means responsive to said detecting means for producing a light emission of varying intensity corresponding to said variable signal, recording means for controlling the movement of a recording medium in the optical path of said varying light emission so that the movement of the medium has a given correlation to the velocity of said sensor and has indicia thereon corresponding to the received signal.

5. A system in accordance with claim 4 further comprising an optical correlator including scaled reference functions corresponding to known radiation source ranges, means for introducing the indicia of said recording medium to the input of said correlator, a further means for controlling the movement of an output recording medium so as to correspond in a predetermined manner to the movement of said first mentioned medium and be responsive to the output of said correlator, the range and azimuth of the radiation source being identified on said output medium.

6. A system in accordance with claim 1 wherein said sensor means has a linearly varying lobe spacing so as to produce a signal envelope of linearly varying frequency.

7. A system in accordance with claim 1 wherein said sensor means provides a signal envelope of random variation.

8. A system in accordance with claim 7 wherein said sensor means comprises a multielement antenna array and phase-shifting means coupled to the antenna elements, said phase-shifting means providing random reversal between successive elements.

9. A system in accordance with claim 1 wherein said sensor means comprises a multielement antenna array and said delay means comprises phase-shifters coupled to said array to provide said nonuniform delay characteristic.

10. A system in accordance with claim 1 wherein said sensor means comprises a multielement antenna array, and said delay means comprises varying effective spacing between successive antenna elements to provide said nonuniform phase characteristic.

11. A system in accordance with claim 10 wherein the spacing of successive lobes of the antenna pattern produced by said multielement antenna vary linearly.

12. A passive radiation mapping system comprising sensor means having a multilobed receiving pattern directed toward an emitting source to be mapped, means for moving said sensor means past said emitting source so that the envelope of the signal received therefrom fluctuates in accordance with the lobe structure of the sensor receiving pattern and means responsive to said signal envelope including means for determining the time of arrival of said signal relative to a reference to provide an azimuth indication of said source and means for determining hte elongation of said signal relative to a reference to provide a range indication of said source.

13. A method of mapping the location of a source of radiation comprising the steps of moving a sensor means having a multilobed receiving pattern past said source to be mapped so that the envelope of the signal received therefrom fluctuates in accordance with the lobe structure of the sensor receiving pattern, determining the time of arrival of said signal relative to a reference to provide an azimuth indication of said source, and determining the elongation of said signal relative to a reference to provide a range indication of said source.

14. A method of mapping according to claim 13 further comprising delaying the received signal in a nonuniform manner with respect to each lobe of the receiving pattern.

15. A method of mapping according to claim 13 comprising correlating the received signal against a plurality of reference functions which are replicas of the received signal but having progressively different scale factors corresponding to different ranges.

References Cited

UNITED STATES PATENTS

| | | | |
|---|---|---|---|
| 2,668,288 | 2/1954 | Perilhou | 343—112.3 |
| 3,121,868 | 2/1964 | Hausz et al. | 343—5CM |
| 3,155,974 | 11/1964 | Seling | 343—112.5 |
| 3,157,874 | 11/1964 | Altar et al. | 343—100.7 |

RODNEY D. BENNETT, Primary Examiner

J. G. BAXTER, Assistant Examiner

UNITED STATES PATENT OFFICE
CERTIFICATE OF CORRECTION

Patent No. 3,560,973         Dated February 2, 1971

Inventor(s) Sidney Kazel

It is certified that error appears in the above-identified patent and that said Letters Patent are hereby corrected as shown below:

Column 3, line 55, correct the spelling of "waveshape";
Column 3, line 62, correct the spelling of "waveshape";
Column 5, line 55, insert a hyphen (-) in the word "baselin Column 8, line 5, correct the spelling of "peaked";
Column 9, Claim 5, line 23, after "further" insert the word
             --recording--;
Column 10, Claim 12, line 16, correct the spelling of "the"

Signed and sealed this 10th day of August 1971.

(SEAL)
Attest:

EDWARD M. FLETCHER, JR.          WILLIAM E. SCHUYLER, JR.
Attesting Officer                Commissioner of Patents